United States Patent
Chiu et al.

(10) Patent No.: US 7,218,628 B2
(45) Date of Patent: May 15, 2007

(54) METHOD AND DEVICE FOR DETECTING PREAMBLE OF WIRELESS DATA FRAME

(75) Inventors: Mao-Ching Chiu, Palo Alto, CA (US);
Chu-Ming Lin, Palo Alto, CA (US);
Po-Hung Chen, Palo Alto, CA (US);
Chin-Wen Lin, Palo Alto, CA (US);
Tai-Yuan Cheng, Palo Alto, CA (US)

(73) Assignee: MediaTek Incorporation, Hsinchu (TW)

( * ) Notice: Subject to any disclaimer, the term of this patent is extended or adjusted under 35 U.S.C. 154(b) by 1053 days.

(21) Appl. No.: 10/209,489

(22) Filed: Jul. 29, 2002

(65) Prior Publication Data

US 2003/0147374 A1   Aug. 7, 2003

Related U.S. Application Data

(60) Provisional application No. 60/355,697, filed on Feb. 7, 2002.

(51) Int. Cl.
*H04J 3/24*   (2006.01)
(52) U.S. Cl. .................... 370/349; 370/342; 370/338
(58) Field of Classification Search ............. 370/329, 370/342, 338, 349
See application file for complete search history.

(56) References Cited

U.S. PATENT DOCUMENTS 5,272,728 A * 12/1993 Ogawa ................. 375/372
5,677,910 A * 10/1997 Delaney ................ 370/402
5,706,428 A *  1/1998 Boer et al. ............. 370/342
5,987,033 A * 11/1999 Boer et al. ............. 370/445
6,092,078 A *  7/2000 Adolfsson .............. 707/102
6,285,681 B1 *  9/2001 Kolze et al. ............ 370/442
6,614,864 B1 *  9/2003 Raphaeli et al. ........ 375/371
6,697,383 B1 *  2/2004 Li et al. ................ 370/510
6,967,994 B2 * 11/2005 Boer et al. ............. 375/219
6,993,100 B2 *  1/2006 Yang et al. ............. 375/342
7,054,296 B1 *  5/2006 Sorrells et al. ......... 370/338
2002/0016949 A1 *  2/2002 Goslin et al. ............. 716/4
2002/0097780 A1 *  7/2002 Odenwalder et al. ..... 375/146

* cited by examiner

*Primary Examiner*—Wing Chan
*Assistant Examiner*—Andrew C. Lee
(74) *Attorney, Agent, or Firm*—J.C. Patents

(57) ABSTRACT

A method and a device for detecting a preamble type of a wireless data frame are provided. The preamble has a synchronization (SYNC) field and a start frame delimiter (SFD) field, and the method comprises following steps. The wireless data frame is first received, and then determined whether the wireless data frame has a short preamble. When the wireless data frame has the short preamble, the wireless data frame is transmitted to a MAC device. In addition, if the wireless data frame does not have the short preamble, it determines whether the wireless data frame has a long preamble. When the wireless data frame has the long preamble, the wireless data frame is then transmitted to the MAC device.

10 Claims, 3 Drawing Sheets

METHOD AND DEVICE FOR DETECTING PREAMBLE OF WIRELESS DATA FRAME

CROSS-REFERENCE TO RELATED APPLICATION

This application claims the priority benefits of U.S. provisional application titled" "METHOD FOR DETECTING PREAMBLE OF WIRELESS DATA FRAME AND THE DEVICE OF THE SAME" filed on Feb. 7, 2002, Ser. No. 60/355,697. All disclosure of this application is incorporated herein by reference.

BACKGROUND OF THE INVENTION

1. Field of the Invention

This invention relates in general to a method and a device for the wireless communication. More specifically relates to a method and a device capable of detecting the preamble type of a received wireless data frame.

2. Description of Related Art

A wireless local area network (Wireless LAN) consists of one or more access points which are connected to a wired LAN. The mobile wireless clients get access to the wired LAN through the access points. This calls for a different control and function of the network, the access points and clients mainly consist of two parts: a radio modem and a controller. The radio modem is a so-called physical layer (PHY) and the control function is a medium access control layer (MAC).

The physical layer handles the transmission of data between the access point and the wireless client. Namely, the PHY layer handles everything from the antenna to the received and demodulated decoded bits. The PHY layer is controlled by the MAC layer.

The MAC layer controls and regulates the usage of the medium with a channel access mechanism. The mechanism divides the use of the radio channel between different users, regulating the user transmissions and avoiding collisions between data packets.

In developing the wireless LAN, different formats of data frame are developed. Currently, there are two formats of the data frame: one has a short type preamble and another one has a long type preamble. It is a key issue to effectively determine whether the received data frame has a short type preamble or a long type preamble so that the performance between the MAC layer and the PHY layer can be increased

SUMMARY OF THE INVENTION

According to the foregoing description, an object of this invention is to provide a method and a device for detecting preamble of a wireless data frame, so that either the short or the long type preamble of the received data frame can be effectively and fast determined.

According to the object(s) mentioned above, a method for detecting a preamble type of a wireless data frame is provided. The preamble has a synchronization (SYNC) field and a start frame delimiter (SFD) field, and the method comprises following steps. The wireless data frame is first received, and then determined whether the wireless data frame has a short preamble. When the wireless data frame has the short preamble, the wireless data frame is transmitted to a MAC device. In addition, if the wireless data frame does not have the short preamble, it determines whether the wireless data frame has a long preamble. When the wireless data frame has the long preamble, the wireless data frame is then transmitted to the MAC device.

To determine whether the wireless data frame has the short preamble, a bit number of the SYNC field for the short type preamble is counted according to the definition of IEEE standard. Then, the following bits for the SFD field are checked to determine whether the SFD field complies with a specified pattern for the short preamble. If the received wireless data frame does not have the short type preamble, the data frame is kept counting to a bit number of the SYNC field for the long type preamble. Then, the following bits for the SFD field are checked to determine whether the SFD field complies with a specified pattern for the long type preamble.

The invention further provides a method for detecting a preamble type of a wireless data frame. The preamble has a synchronization (SYNC) field and a start frame delimiter (SFD) field. The method comprises following steps. The wireless data frame is first received, and is presumed that the received wireless data frame has a short type preamble. Next, the wireless data frame is determined whether it has the short preamble. When the wireless data frame has the short preamble, the wireless data frame is transmitted to a MAC device. In addition, if the wireless data frame does not have the short preamble, the received wireless data frame is further presumed that it has a long type preamble, and then the data frame is determined whether the wireless data frame has the long preamble. When the wireless data frame has the long preamble, the wireless data frame is transmitted to the MAC device.

To determine whether the wireless data frame has the short preamble, a bit number of the SYNC field for the short type preamble is counted according to the definition of IEEE standard. Then, the following bits for the SFD field are checked to determine whether the SFD field complies with a specified pattern for the short preamble. If the received wireless data frame does not have the short type preamble, the data frame is kept counting to a bit number of the SYNC field for the long type preamble. Then, the following bits for the SFD field are checked to determine whether the SFD field complies with a specified pattern for the long type preamble.

The invention further provides a device capable of detecting a preamble type of a wireless data frame. The preamble has a synchronization (SYNC) field and a start frame delimiter (SFD) field. The device comprises a MAC (media access control) device, a receiver for receiving the wireless data frame; a demodulator/decoder module coupled to the receiver; a descrambler coupled to the demodulator/decoder module; a switching device coupled between the MAC device and the descrambler; and a preamble detector coupled to the descrambler and the switching device. The preamble detector can output a control signal to the switching device for establishing a connection between the descrambler and the MAC device when either a short type preamble or a long type preamble of the received wireless data frame is detected. To determine the preamble type of the received wireless data frame, the preamble detector further comprises a counter for counting bits of the received wireless data frame.

According to the invention, the short or the long type preamble of the received data frame can be effectively and fast determined to increase the performance of the receiver.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1A:
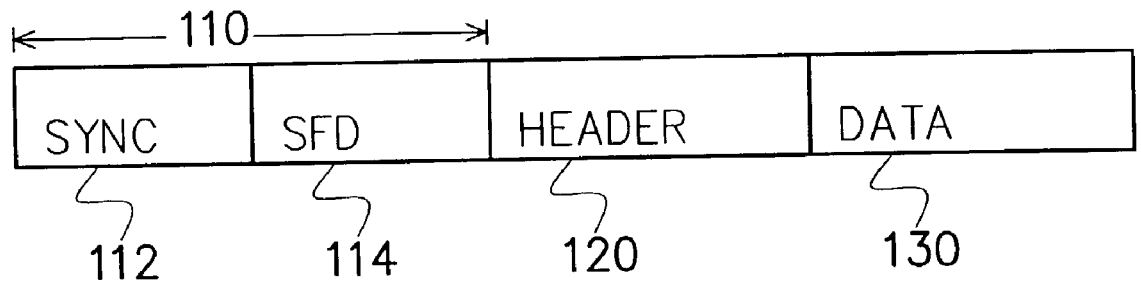
FIG. 1A schematically shows a data frame for the Wireless LAN.

A brief to the data frame format used in the wireless LAN is first discussed. FIG. 1 schematically shows a data frame for the Wireless LAN The data frame 100 is consisting of a synchronization (SYNC) field 112, a start frame delimiter (SFD) field 114, a header field 120 and a data field 130. The synchronization (SYNC) field 112 and the start frame delimiter (SFD) field 114 form a preamble portion 110 of the data frame 100, which is used for identifying the type of the data frame.

According to IEEE standard 802.11b, there are two types of preambles for the message frame, each type has a different length of preamble. One is the short preamble with a 56-bit SYNC field, and another one is the long preamble with a 128-bit SYNC field. According to the length (bit number) of the SYNC field 112, the data frame type can be first determined temporally. For example, if a 56-bit SYNC field is detected, the received data frame 100 may be the short preamble type, while if a 128-bit SYNC field is detected, the received data frame may be the long preamble type.

Figure 1B:
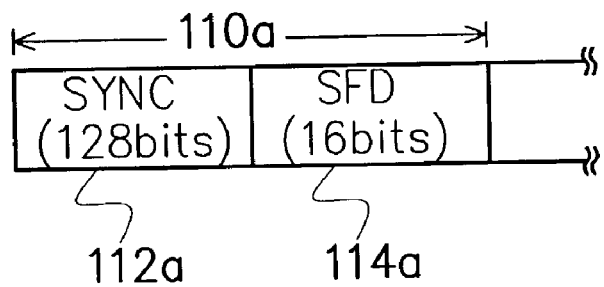
FIG. 1B shows an exemplary format of the long preamble for the data frame used in the wireless LAN.
Figure 1C:
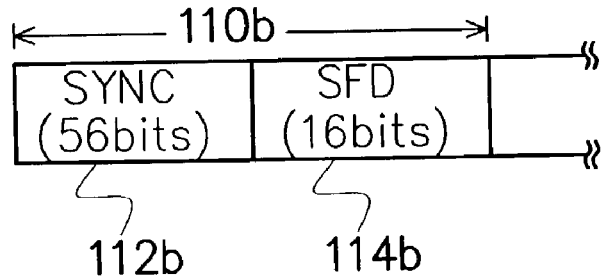
FIG. 1C shows an exemplary format of the short preamble for the data frame used in the wireless LAN.

To determine the frame type exactly, the SFD field 114 has to be further checked. According to IEEE standard 802.11b, the SFD field 114 has a specified pattern for the long preamble data frame and the short preamble data frame, respectively. FIG. 1B shows an exemplary format of the long preamble for the data frame used in the wireless LAN. The preamble portion 110a for a long preamble type data frame includes a 128-bit SYNC field 112a and a 16-bit SFD field 114a, and the SFD field has a fixed pattern of [1111001110100000] defined by IEEE standard 802.11b. In addition, FIG. 1C shows an exemplary format of the short preamble for the data frame used in the wireless LAN. The preamble portion 110b for a short preamble type data frame includes a 56-bit SYNC field 112b and a 16-bit SFD field 114b, and the SFD field has a fixed pattern of [0000110001011111] defined by IEEE standard 802.11b.

Therefore, after checking the SFD field of the data frame, if a pattern of [1111001110100000] is detected, the received data frame can be determined as a long preamble type data frame, and if a pattern of [0000110001011111] is detected, the received data frame can be determined as a short preamble type data frame.

Figure 2:
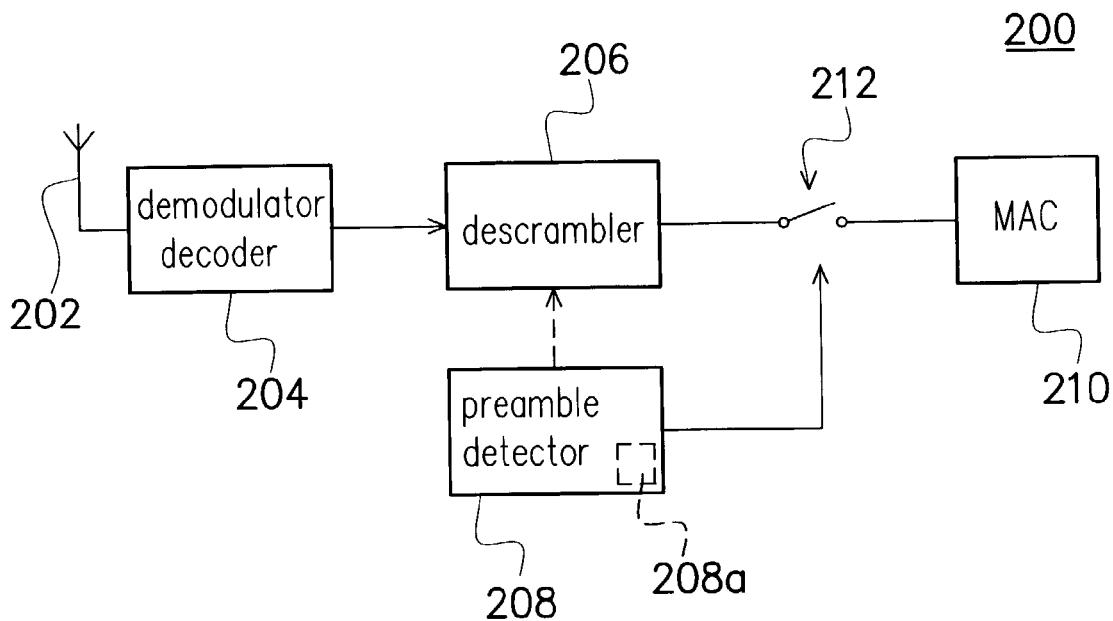
FIG. 2 shows an exemplary block diagram for detecting the preamble according to the embodiment of the invention.

FIG. 2 shows an exemplary block diagram for detecting the preamble according to the embodiment of the invention. In general, FIG. 2 can represent a receiver 200 in a wireless LAN. The receiver 200 for detecting the preamble type of the data frame, comprises a receiver 202, a demodulator/decoder module 204, a descrambler 206, a preamble detector 208, a switch 212 and a MAC (media access controller) device 210. The receiver 202, which can be an antenna, is used for receiving signal in a wireless manner. The received signal is then demodulated and decoded by the demodulator/decoder module 204. To those skilled in this art, the demodulator and the decoder in module 204 can be separated elements or integrated together in a single chip. After the received data is demodulated and decoded, it is transmitted to the descrambler 206.

The preamble detector 208 is a key element of the invention. According to one embodiment of the invention, the preamble detector 208 can be coupled between the descrambler 206 and the MAC device 210 via a switching device 212 The switching device 212 is coupled between the descrambler 206 and the MAC device 210, and can be a transistor (MOS or FET etc) or other similar elements. The preamble detector 208 is used for determining the preamble type of the received data frame and then controlling the switching device 212. The operation of the preamble detector 208 is described in detail in following paragraphs. In response to an output signal of the preamble detector 208, the switching can be turned on or off so that the received data frame can be transmitted to the MAC device 210.

Initially, the switching device 212 is open (turned off) and the preamble detector 208 is set at a preliminary stage where the received data frame is presumed as a short type preamble. When receiving the data frame, the preamble detector 208 first counts the bit number of the SYNC field of the received data frame by a counter 208a for example. As mentioned above, the received data frame can be presumed as a short type preamble so that bit number of SYNC field is presumed as 56 bits. After counting 56 bits, the preamble detector 208 keeps detecting the SFD field of the received data frame from the 57$^{th}$ bit. According to IEEE standard 802.11b, if a pattern of [0000110001011111] in the following 16 bits is detected, the received data frame can be determined as a short preamble type data frame. Once the short type preamble of the received data frame is confirmed, the preamble detector 208 outputs a control signal to turn on (close) the switching device 212, so that the descrambler 206 and the MAC device 210 are connected. Therefore, the received data frame is transmitted to the MAC device 210 after descrambled.

On the other hand, if the SFD field of the presumed short preamble does not satisfy the pattern of [0000110001011111]. The preamble detector 208 changes to detect whether the received data frame is a long preamble type. As mentioned above, if the received data frame is a long type preamble, the bit number of SYNC field is presumed as 128 bits. After counting 128 bits, the preamble detector 208 keeps detecting the SFD field of the received data frame from the 129$^{th}$ bit. According to IEEE standard 802.11b, if a pattern of [1111001110100000] in the following 16 bits is detected, the received data frame can be determined as a long preamble type data frame. Once the long type preamble of the received data frame is confirmed, the preamble detector 208 outputs a control signal to turn on (close) the switching device 212, so that the descrambler 206 and the MAC device 210 are connected. Therefore, the received data frame is transmitted to the MAC device 210 after descrambled.

If the preamble detector 208 determines that the received data frame is neither the short nor the long preamble type, the receiver 200 will discard all the received data frames and turn back to a mode listening to the new-coming data frames.

According to the above embodiment, the preamble detector 208 is coupled to the descrambler 206. Namely, the process for detecting the preamble type is performed after the received data frame is descrambled However, the preamble detector can be arranged at any location. For example, the preamble detector 208 can be directly coupled to the receiver 202 to immediately detect the preamble type as soon as the data frame is received. Alternatively, the preamble detector 208 can be coupled to the demodulator/decoder module 204 to detect the preamble type after the received data frame is demodulated and decoded. It should be noted that if the position of the preamble detector 208 is changed, its corresponding interior configuration should be modified.

Figure 3:
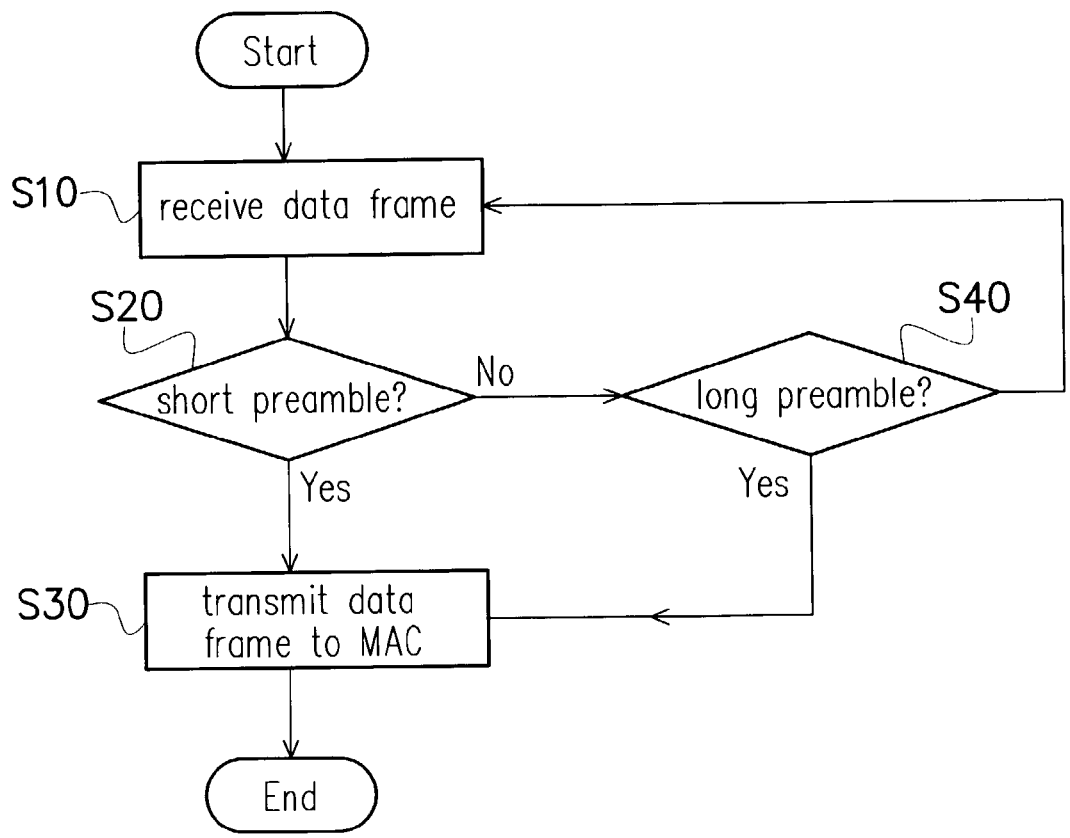
FIG. 3 shows a flowing chart for performing the preamble detecting process according to one embodiment of the invention.
Figure 4:
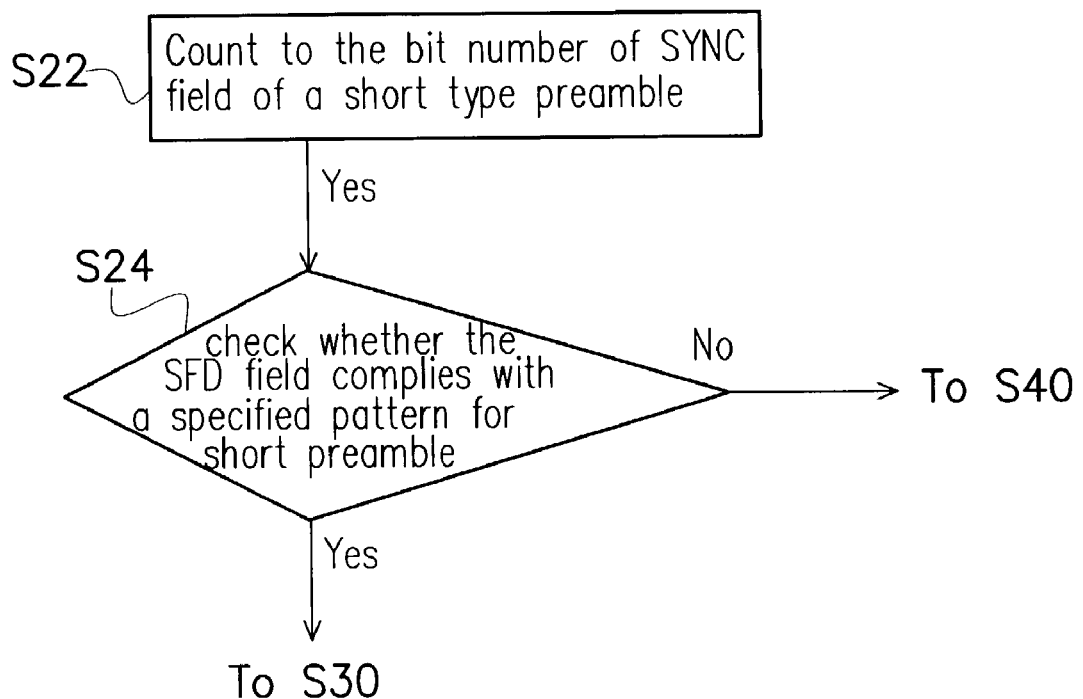
FIG. 4 shows a flowing chart for determining the short type preamble according to one embodiment of the invention.

FIG. 3 shows a flowing chart for performing the preamble detecting process according to the invention. FIG. 4 shows a flowing chart for determining the short type preamble, and FIG. 5 shows a flowing chart for determining the long type preamble according to one embodiment of the invention.

Referring to FIG. 3 together with FIG. 2, at step 510, the data frame is received by a receiver, such as the antenna 202 in FIG. 2, in a wireless manner. At step S20, the received data frame is presumed as a short type preamble and then the received data frame is exactly determined whether it has really a short type preamble. Referring to FIG. 4, at step S22, the received data frame is counted to the bit number of the SYNC field of a short type preamble. According to IEEE standard 802.11b, the bit number of the SYNC field for a short type preamble is 56 bits. Therefore, at step S22, the received data frame is presumed as a short type preamble and counted to the $56^{th}$ bit. At step S24, the SFD field of the received data frame is checked. Because the received data frame is presumed as a short type preamble, the SFD field begins at the $57^{th}$ bit of the received data frame. In addition, as. defined by IEEE standard 802.11b, the SFD field for the short type preamble is 16 bits and has a specified pattern of [0000110001011111]. Therefore, the $57^{th}$ bit to the $72^{nd}$ bit will be checked to determine whether these bit satisfies the specified pattern of [0000110001011111]. If the checked pattern is satisfied, the data frame is determined as having a short type preamble and then transmitted to the MAC device 210 (see FIG. 2) at step S30. If the checked pattern is not satisfied, step S40 is performed to determine whether the received data frame has a long type preamble.

Figure 5:
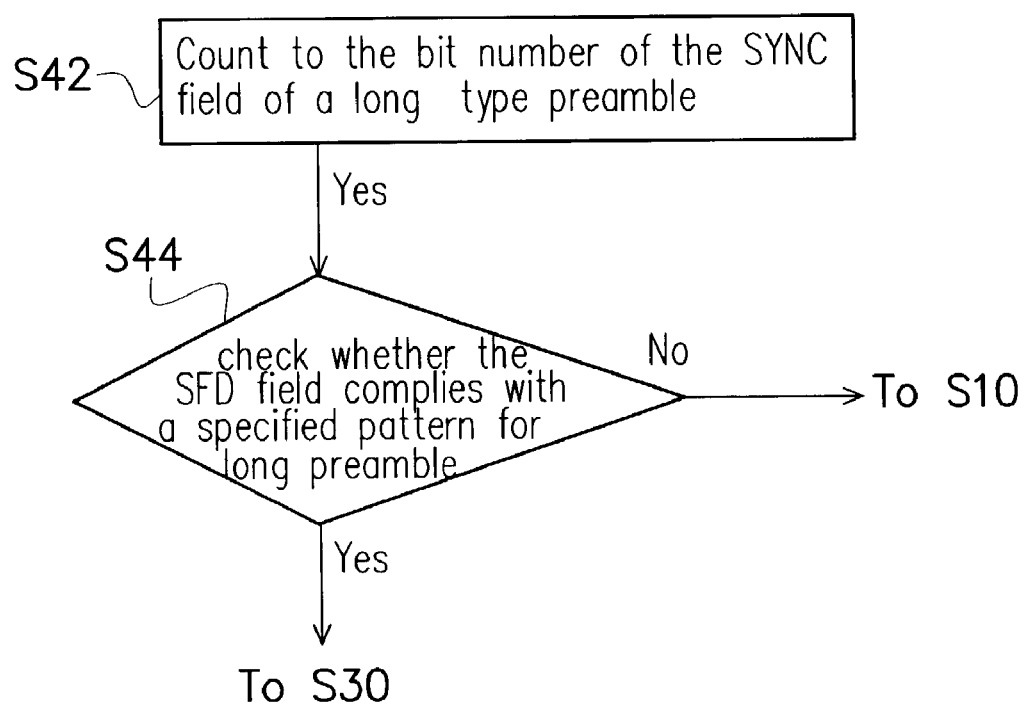
FIG. 5 shows a flowing chart for determining the long type preamble according to one embodiment of the invention

Referring to FIG. 3 together with FIG. 5, at step S20, if the received data frame is not a short preamble, step S40 is performed to check whether the received data frame has a long type preamble. At step S42, the received data frame is kept counting to the bit number of the SYNC field of a long type preamble. According to IEEE standard 802.11b, the bit number of the SYNC field for a long type preamble is 128 bits. Therefore, at step S42, the received data frame is counted to the $128^{th}$ bit. At step S44, the SFD field of the received data frame is then checked. Because the received data frame is presumed as a long type preamble, the SFD field begins at the $129^{th}$ bit of the received data frame. In addition, as defined by IEEE standard 802.11b. the SFD field for the long type preamble is 16 bits and has a specified pattern of [1111001110100000]. Therefore, the $129^{th}$ bit to the $144^{th}$ bit will be checked to determined whether these bit satisfies the specified pattern of [1111001110100000]. If the checked pattern is satisfied, the data frame is determined as having a long type preamble and then transmitted to the MAC device 210 (see FIG. 2) at step S30. If the checked pattern is not satisfied, all the data frame is discarded and step S10 is performed again to receive the new coming data frame.

According to the invention, the short or the long type preamble of the received data frame can be effectively and fast determined to increase the performance of the receiver.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A method for detecting a preamble type of a wireless data frame, wherein the preamble has a synchronization (SYNC) field and a start frame delimiter (SFD) field, the method comprising steps of:

receiving the wireless data frame;

determining whether the wireless data frame has a short preamble by checking a pattern of the SFD according to a length of the SYNC field of the received wireless data frame;

transmitting the wireless data frame to a MAC device when the wireless data frame has the short preamble;

determining whether the wireless data frame has a long preamble if the wireless data frame does not have the short preamble; and, transmitting the wireless data frame to the MAC device when the wireless data frame has the long preamble.

2. The method of claim 1, wherein the step for determining whether the wireless data frame has the short preamble further comprises steps of:

counting to a bit number of the SYNC field for the short type preamble; and checking whether the SFD field complies with a specified pattern for the short preamble.

3. The method of claim 2, wherein the step for determining whether the wireless data frame has the long preamble further comprises steps of:

keeping counting to a bit number of the SYNC field for the long type preamble; and checking whether the SFD field complies with a specified pattern for the long preamble.

4. The method of claim 1, further comprising steps of:

discarding the received data frame if the received data frame has neither the short type nor the long type preamble; and turning to a mode listening to a new-coming wireless data frame.

5. A method for detecting a preamble type of a wireless data frame, wherein the preamble has a synchronization (SYNC) field and a start frame delimiter (SFD field, the method comprising steps of:

receiving the wireless data frame;

presuming that the received wireless data frame has a short type preamble;

determining whether the wireless data frame has the short preamble by checking a pattern of the SFD according to a length of the SYNC field of the received wireless data frame;

transmitting the wireless data frame to a MAC device when the wireless data frame has the short preamble;

presuming that the received wireless data frame has a long type preamble if the wireless data frame does not have the short preamble;

determining whether the wireless data frame has the long preamble; and transmitting the wireless data frame to the MAC device when the wireless data frame has the long preamble.

6. The method of claim 5, wherein the step for determining whether the wireless data frame has the short preamble further comprises steps of:

counting to a bit number of the SYNC field for the short type preamble; and checking whether the SFD field complies with a specified pattern for the short preamble.

7. The method of claim 6, wherein the step for determining whether the wireless data frame has the long preamble further comprises steps of:

keeping counting to a bit number of the SYNC field for the long type preamble; and checking whether the SFD field complies with a specified pattern for the long preamble.

8. The method of claim 5, further comprising steps of:

discarding the received data frame if the received data frame has neither the short type nor the long type preamble; and turning to a mode listening to a new-coming wireless data frame.

9. A device capable of detecting a preamble type of a wireless data frame, wherein the preamble has a synchronization (SYNC) field and a start frame delimiter (SFD) field the device comprising:

a MAC (media access control) device;

a receiver for receiving the wireless data frame;

a demodulator/decoder module coupled to the receiver;

a descrambler coupled to the demodulator/decoder module;

a switching device coupled between the MAC device and the descrambler; and a preamble detector, coupled to the descrambler and the switching device, wherein the preamble detector outputs a control signal to the switching device for establishing a connection between the descrambler and the MAC device when the received wireless data frame has a short type preamble or a long type preamble, wherein the short or the long type preamble is determined according to a length of the SYNC field of the received wireless data frame and then checking a pattern of the SFD.

10. The device of claim 9, wherein the preamble detector further comprises a counter for counting bits of the received wireless data frame.

* * * * *